(12) United States Patent
Nakajima et al.

(10) Patent No.: US 11,584,167 B2
(45) Date of Patent: Feb. 21, 2023

(54) TIRE

(71) Applicant: Sumitomo Rubber Industries, Ltd., Kobe (JP)

(72) Inventors: Koichi Nakajima, Kobe (JP); Tetsuya Sakaguchi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/407,294

(22) Filed: Aug. 20, 2021

(65) Prior Publication Data

US 2022/0055416 A1 Feb. 24, 2022

(30) Foreign Application Priority Data

Aug. 24, 2020 (JP) .............................. JP2020-141063

(51) Int. Cl.
*B60C 13/00* (2006.01)

(52) U.S. Cl.
CPC .................................. *B60C 13/001* (2013.01)

(58) Field of Classification Search
CPC ........ B60C 13/001; B60C 13/00; B60C 13/02
See application file for complete search history.

(56) References Cited

U.S. PATENT DOCUMENTS

2020/0262251 A1* 8/2020 Sakaguchi ............ B60C 13/001

FOREIGN PATENT DOCUMENTS

| EP | 253557 A | * | 1/1988 | .......... B60C 13/001 |
| JP | 2003-320818 A | | 11/2003 | |
| JP | 2003320818 A | * | 11/2003 | |
| JP | 2007083604 A | * | 4/2007 | |

OTHER PUBLICATIONS

JP 2003-320818 Machine Translation; Hiro, Masataka (Year: 2003).*
JP 2007-083604 Machine Translation; Kitamura, Yoshifumi (Year: 2007).*
Admin. "How to Draw 3D Letters in One Point Perspective—Perspective Drawing Tutorial." drawinghowtodraw.com, 2016, https://www.drawinghowtodraw.com/stepbystepdrawinglessons/2016/04/draw-3d-letters-one-point-perspective-perspective-drawing-tutorial/ (Year: 2016).*

* cited by examiner

*Primary Examiner* — Robert C Dye
*Assistant Examiner* — Nicholas J Weiler
(74) *Attorney, Agent, or Firm* — Xsensus LLP

(57) ABSTRACT

At least one mark in the form of a character or a figure and a surface geometry arrangement region can be disposed on a surface of a sidewall portion. The surface geometry arrangement region can include a first region formed adjacent to the mark outside the mark. The first region can have a plurality of first micro projections disposed therein. The first region can extend radially from a vanishing point on the surface of the sidewall portion toward the mark so as to allow the mark to be stereoscopically viewed.

16 Claims, 13 Drawing Sheets

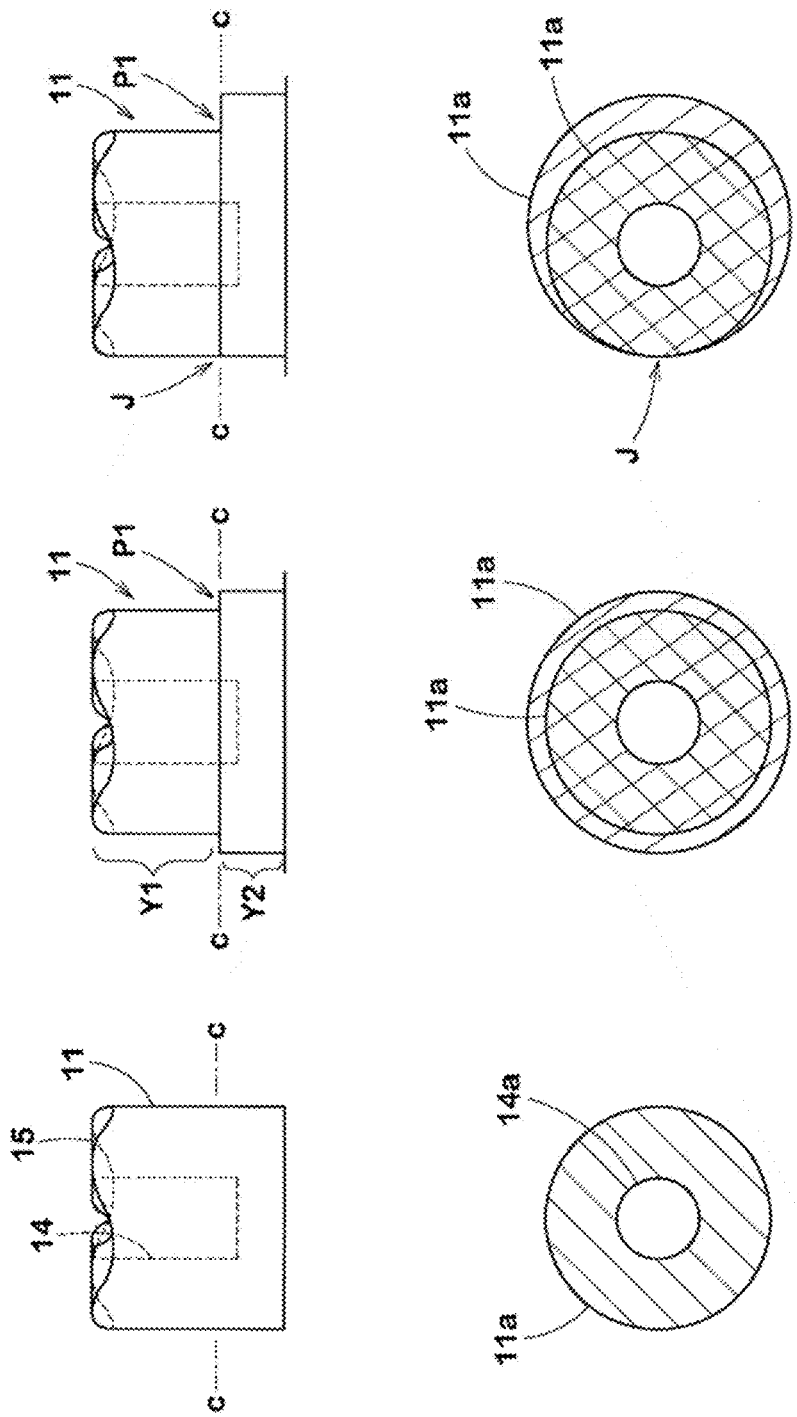

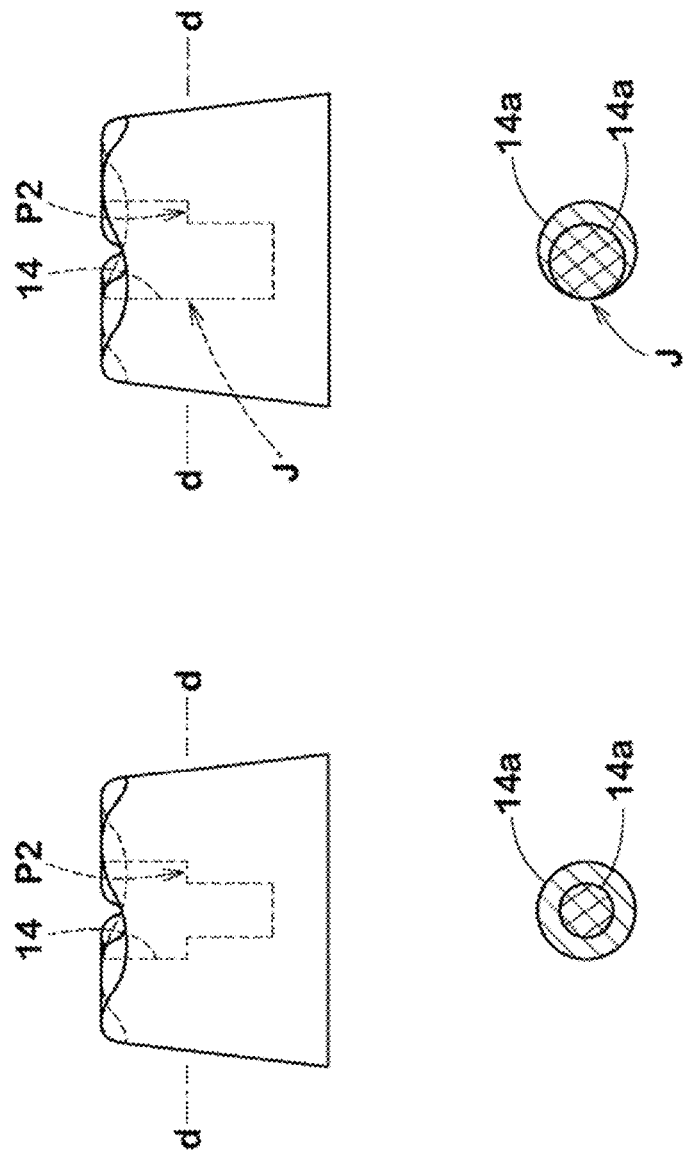

TIRE

CROSS-REFERENCE TO RELATED APPLICATION

The present application claims priority to Japanese patent application JP 2020-141063, filed on Aug. 24, 2020, the entire contents of which are incorporated herein by reference in its entirety.

BACKGROUND

Technical Field

The present disclosure relates to a tire having a surface geometry arrangement formed on an outer surface of a sidewall portion.

Description of the Background Art

A tire may have marks formed by characters or figures which represent a manufacturer name, a brand name, or the like of the tire, on a surface of a sidewall portion. Such a mark may be in the form of a projecting mark that projects from the surface of the sidewall portion or a recessed mark that is recessed from the surface in order to enhance visibility.

However, the projecting mark may cause deterioration of air resistance, so that the projecting mark should not be formed so as to extend excessively from the surface of the sidewall portion. On the other hand, the recessed mark should not be formed so as to become so deep due to restriction of the thickness of a rubber gauge in the sidewall portion. At least for these reasons, it can be difficult to sufficiently enhance visibility of the mark.

Meanwhile, Japanese Laid-Open Patent Publication No. 2003-320818 ("JP '818 publication") discloses a tire in which a band-shaped decorative portion, and an indicia indication portion such as a mark in the decorative portion are disposed on a surface of a sidewall portion. The decorative portion is formed by a first serration and the indicia indication portion is formed by a second serration. The first serration and the second serration are formed by eccentric serrations formed by ridges that extend from different eccentric centers deviating from the tire rotation center.

In the tire of the JP '818 publication, both a ridge alignment density and a ridge inclination angle are changed, whereby, according to the JP '818 publication, an effect of camouflaging defective outer appearance is enhanced. However, visibility of indicia as the mark may not be sufficiently enhanced, and may be required to be further enhanced.

The present disclosure has been made in view of the aforementioned problem (and additional problems). As such, embodiments of the present disclosure can provide a tire that can allow enhancement of visibility of a mark formed on a surface of a sidewall portion.

SUMMARY

The present disclosure is directed to a tire including a sidewall portion. At least one mark in the form of a character or a figure can be disposed on a surface of the sidewall portion. A surface geometry arrangement region can include a first region and can be formed adjacent to the mark on the surface of the sidewall portion outside the mark. The first region can have a plurality of first micro projections disposed therein. The first region can extend radially from a vanishing point on the surface of the sidewall portion toward the mark so as to allow the mark to be stereoscopically viewed.

According to another aspect, a tire can comprise: a sidewall portion, wherein at least one mark in the form of a character or a figure can be disposed on a surface of the sidewall portion, wherein a surface geometry arrangement region can be formed at least partially adjacent to the mark on the surface of the sidewall portion outside the mark, wherein the surface geometry arrangement region can include a first region that has a plurality of first micro projections, and wherein the first region can extend radially from a vanishing point on the surface of the sidewall portion toward the mark.

BRIEF DESCRIPTION OF THE DRAWINGS

FIGS. 10A to 10C each illustrate a side view of a first micro projection according to still another embodiment of the disclosed subject matter, as well as a plan view of a cross-sectional shape of the first micro projection at positions on a line c-c in each side view;

FIG. 11A and FIG. 11B each illustrate a side view of a first micro projection according to still another embodiment of the disclosed subject matter, as well as a plan view of a cross-sectional shape of a recess at positions on a line d-d in each side view;

DETAILED DESCRIPTION

Embodiments of the present disclosure will be described below in detail.

Figure 1:
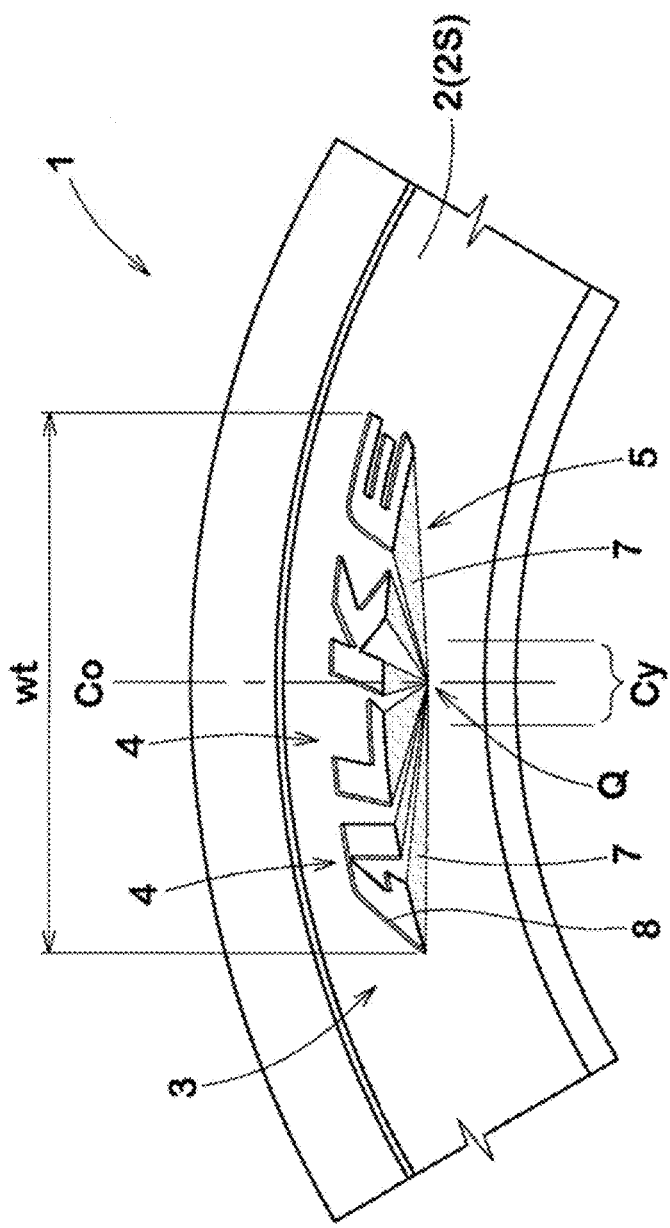
FIG. 1 is a partial side view of a sidewall portion of a tire according to an embodiment of the present disclosure, as viewed from the front of the sidewall portion.
Figure 2:
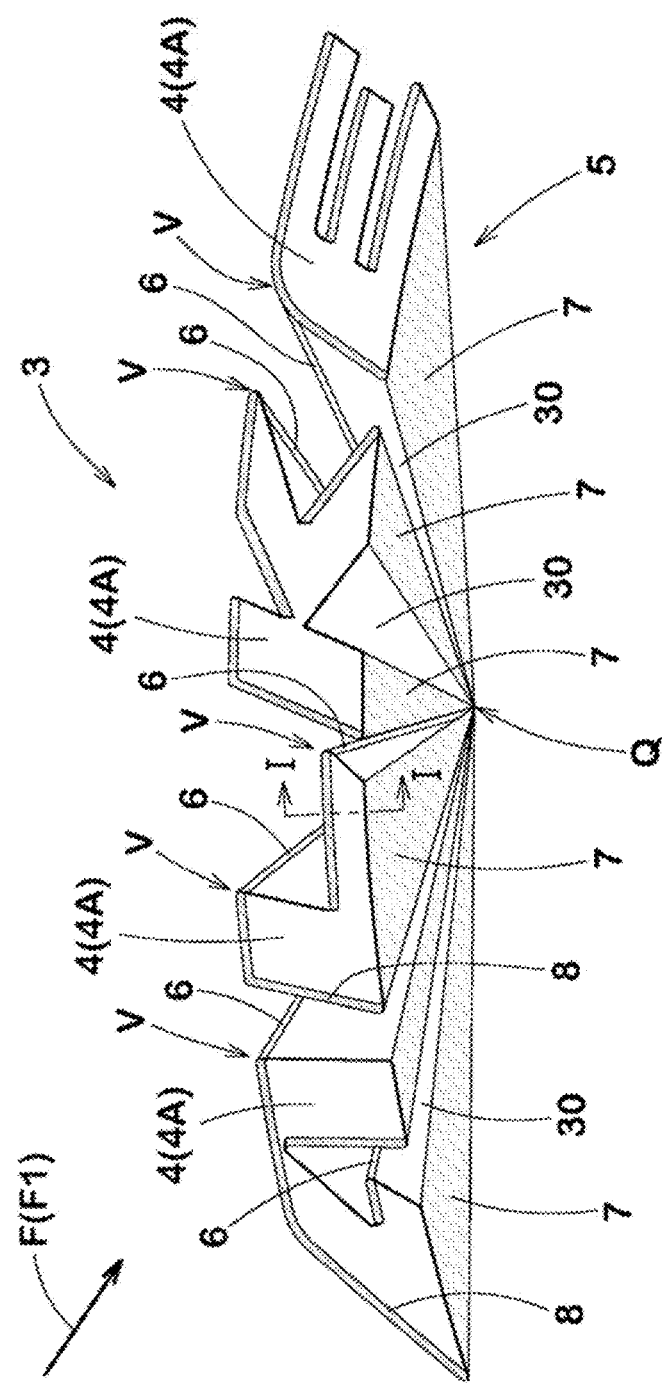
FIG. 2 is a partially enlarged side view conceptually illustrating a recessed mark and a surface geometry arrangement region, according to one or more embodiments of the present disclosure, as viewed from the front of the sidewall portion.

As shown in FIG. 1 and FIG. 2, a tire 1 according to the present embodiment can have indicia 3 representing, for example, a manufacturer name, a brand name, and/or a size of the tire, on a surface 2S of at least one sidewall portion 2.

The indicia 3 can include at least one mark 4. The mark 4 can be in the form of a character or a figure, and may be a minimum unit of the indicia 3. In this embodiment, the indicia 3 are in the form of a character string of "ALKE" representing, for example, a brand name, by four marks 4 of "A", "L", "K", and "E".

A surface geometry arrangement region 5 can be formed on the surface 2S of the sidewall portion 2. The surface geometry arrangement region 5 can include a first region 7 disposed adjacent to the mark 4 outside the mark 4. In this embodiment, the surface geometry arrangement region 5 can further include a second region 8 disposed on the mark 4, in the mark 4, or outside the mark 4.

The first region 7 can radially extend from a vanishing point Q on the surface 2S of the sidewall portion 2 toward the mark 4 so as to allow the mark 4 to be stereoscopically viewed. In this embodiment, the surface geometry arrangement region 5 can include a plurality of the first regions 7 extending from the vanishing point Q to the respective marks 4. However, the first region 7 may extend only to a specific mark 4 selected from a plurality of the marks 4. The specific mark 4 may be a single mark or a plurality of marks (e.g., less than all the marks 4).

The vanishing point Q may be disposed inwardly of the indicia 3 in the tire radial direction. According to one or more embodiments, the vanishing point Q may be disposed at a center portion Cy, which may include a width center Co of a width wt of the indicia 3 in the tire circumferential direction. The center portion Cy may be defined or characterized as a region in which a distance from the width center Co to each end in the circumferential direction is not greater than 5% of the width wt.

Figure 3:
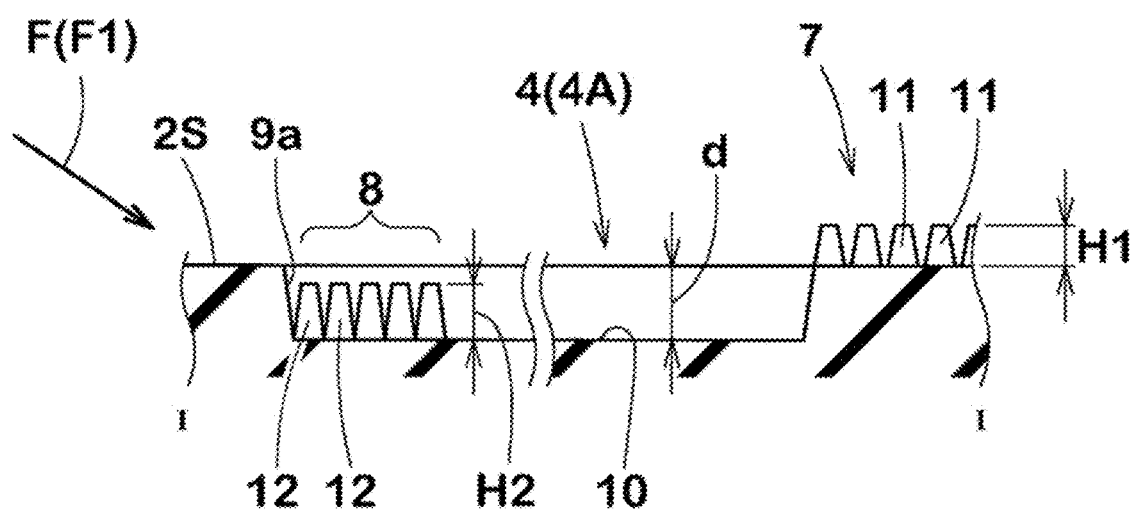
FIG. 3 is a cross-sectional view of the recessed mark and the surface geometry arrangement region as taken along a line I-I in FIG. 2.

FIG. 3 shows a cross-section taken along a line I-I in FIG. 2. As shown in FIG. 3, the first region 7 can have first micro projections 11 disposed next to each other. In this embodiment, the first micro projections 11 can be spaced from each other. However, the first micro projections 11 may be disposed adjacent to each other. For instance, bases of some or all adjacent first micro projections 11 may touch each other. Incidentally, micro projections (e.g., first micro projections 11), as implemented according to one or more embodiments of the disclosed subject matter, may be characterized or defined as "micro" in at least the width dimension (in the left-right direction of FIG. 3) relative to the width of the mark 4, such as shown in FIG. 3.

As shown in FIG. 2, in a case where a plurality of the first regions 7 is disposed, an arrangement density at which the first micro projections 11 are disposed can be the same among the first regions 7. The "arrangement density" can be defined as a proportion of the sum of bottom areas of the first micro projections 11 in a unit area. In other words, the arrangement density can be defined as a ratio Σs/S of the sum Σs of areas s (corresponding to cross-sectional areas of the first micro projections 11 at the lower ends) of bottom surfaces of the first micro projections 11 formed in a surface having a unit area, to the unit area S.

In the first region 7 having such a structure, the plurality of the first micro projections 11 can inhibit light from being reflected, which may enhance light absorptivity. Therefore, the first region 7 can look darker as compared with the mark 4 disposed adjacent thereto. Furthermore, the first region 7 can radially extend from the vanishing point Q toward the mark 4.

Thus, the mark 4 can be stereoscopically represented, particularly, the mark 4 can appear as if it projects from the depth side. As a result, appearance can be enhanced, the mark 4 can be represented with a stereoscopic effect, and visibility of the mark 4 can be enhanced. A smooth surface region 30 may radially extend and can be formed as a smooth surface without having micro projections (e.g., first micro projections 11) is disposed between the first regions 7 and 7. That is, the surface geometry arrangement region 5 can include the first regions 7 and the smooth surface regions 30 that may radially extend from the vanishing point Q such that the first regions 7 and the smooth surface regions 30 alternate.

In FIG. 2, reference character 6 can represent a linear projection that projects from the surface 2S of the sidewall portion 2. The linear projection 6 can extend toward the vanishing point Q, for example, from an external corner V on the shape line of the mark 4, and can allow the mark 4 to be more stereoscopically viewed in conjunction with the first region 7.

The surface geometry arrangement region 5 may include, for example, the second region 8. The second region 8 can have second micro projections 12 disposed adjacent to each other, as shown in FIG. 3. For instance, bases of some or all adjacent second micro projections 12 may touch each other. As noted above, micro projections (e.g., second micro projections 12), as implemented according to one or more embodiments of the disclosed subject matter, may be characterized or defined as "micro" in at least the width dimension (in the left-right direction of FIG. 3) relative to the width of the mark 4, such as shown in FIG. 3.

Figure 4A:
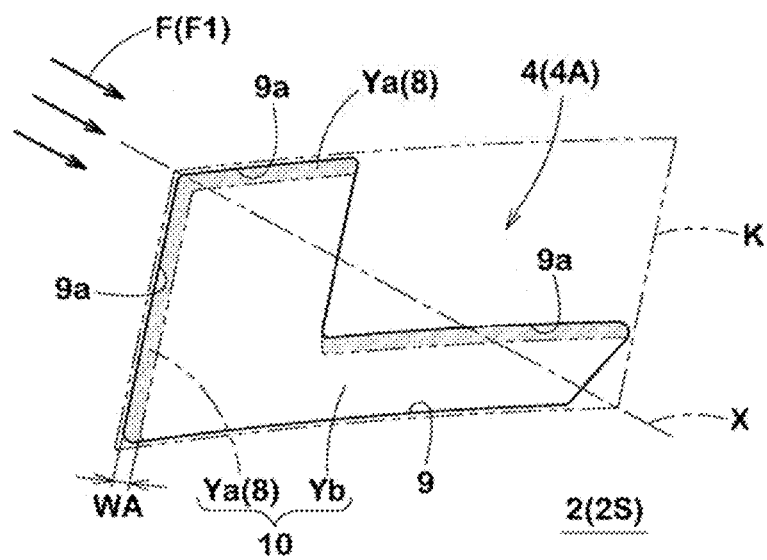
FIG. 4A illustrates the recessed mark as viewed from the front thereof.
Figure 4B:
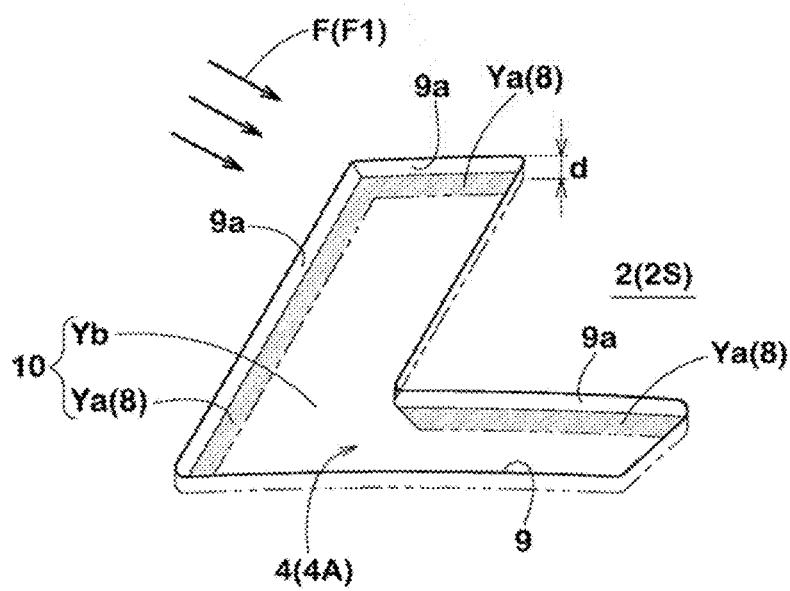
FIG. 4B is a perspective view of the recessed mark as diagonally viewed.

As shown in FIG. 4A and FIG. 4B, the mark 4 can include a side wall surface 9, and the second region 8 may be formed in a region Ya (hereinafter, may be referred to as "shadow region Ya") in which a shadow can be formed by the side wall surface 9, for instance, at least when light is applied to the mark 4 in a first direction F.

Specifically, in this embodiment, the mark 4 can be in the form of a recessed mark 4A that is recessed from the surface 2S of the sidewall portion 2, for instance, so as to be stepped. That is, according to one or more embodiments, the recessed mark 4A can have a bottom surface 10, and the side wall surface 9 that is raised from the bottom surface 10, to form the shape of the recessed mark 4A.

The bottom surface 10 can be divided into the shadow region Ya and a bright region Yb other than the shadow region Ya. Here, brightness of the bright region Yb may be relative to the darkness of the shadow region Ya. The shadow region Ya may be a width region on the bottom surface 10 along a shadow wall portion 9a. The shadow wall portion 9a can represent a surface portion, in the side wall surface 9, which may be shadowed when light is applied, for instance, at least in the first direction F. In this embodiment, light may be applied from the diagonally upper left side as viewed from the front. Thus, surface portions of the side wall surface 9 which face rightward and downward correspond to the shadow wall portion 9a that blocks light. "Viewed from the front" can represent a state where the mark 4 is viewed from the front thereof when the outer side in the tire radial direction is the upper side.

The shadow region Ya along the shadow wall portion 9a can be formed as the second region 8 in which a plurality of the second micro projections 12 can be disposed, for instance, adjacent to each other. The bright region Yb may be formed as a smooth surface having no micro projections (e.g., micro projections 12).

In the second region 8 having such a structure, the plurality of the second micro projections 12 can inhibit light from being reflected, and can enhance light absorptivity, for instance, to allow the second region 8 to look blackish.

As a result, the bottom surface 10 of the recessed mark 4A can have contrast (between brightness and darkness), and the second region 8 can be represented as a shadow formed by the side wall surface 9, for instance, when light is applied at least in the first direction F. Furthermore, the shadow can be represented as a part of the side wall surface 9. The recessed mark 4A can appear as if it has a depth greater than an actual depth d due to optical illusion, the stereoscopic effect can become higher, and visibility can be enhanced. For these effects, a width WA of the second region 8 may be greater than the depth d of the recessed mark 4A. The width WA can be a width in a direction orthogonal to the shadow wall portion 9a. The upper limit of the width WA can be, but is not limited to, not greater than 4.0 times the depth d, for instance, in order to exhibit the stereoscopic effect.

In this embodiment, the visibility of the mark 4 can be further enhanced by a synergistic effect of an effect of the second region 8 that the mark 4 appears as if it has a depth greater than an actual depth and an effect of the first region 7 that the mark 4 appears as if it projects from the depth side.

It this case, if the first region 7 looks more blackish than the second region 8, the first region 7 may become more conspicuous than the mark 4, balance may become poor, and an effect of allowing the mark 4 to appear as if it projects may tend to be lowered. Therefore, as shown in FIG. 3, a projection height H1 of the first micro projection 11 may be less than a projection height H2 of the second micro projection 12. For the same reason, the arrangement density of the first micro projections 11 can be less than the arrangement density of the second micro projections 12, that is, the first micro projections 11 can be disposed more sparsely than the second micro projections 12. The first micro projections 11 and/or the second micro projections 12 may have a uniform density, for instance. That is, the first micro projections 11 may have a uniform density. Additionally or alternatively, the second micro projections 12 may have a uniform density, wherein the density of the first micro projections 11 may be less than the density of the second micro projections 12, as noted above.

As shown in FIG. 4A, for instance, the first direction F can be a diagonal line direction F1 as viewed from the front of the mark 4. Particularly, the first direction F can be the diagonal line direction F1, from the diagonally upper side, facing from the tire radially outer side, toward the tire radially inner side as viewed from the front. Thus, an effect of stereoscopically rendering the mark 4 can be further enhanced. The diagonal line direction F1 can represent a direction in which an angle relative to a reference line X is not greater than 20°, for instance, not greater than 10°, where the reference line X represents a diagonal line of a parallelogram K having the smallest area among the parallelograms surrounding the mark 4.

Figure 5A:
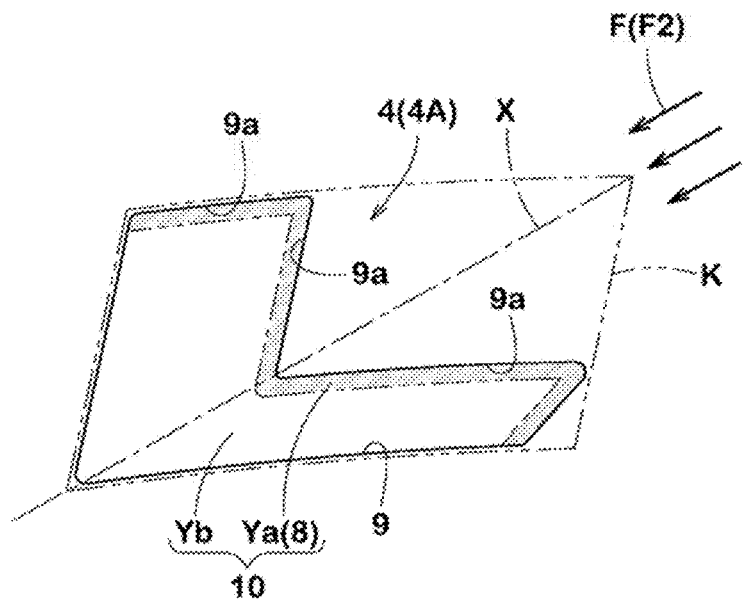
FIG. 5A and FIG. 5B are a front view and a perspective view, respectively, of a mark in the case of a first direction being a diagonal line direction from the diagonally upper right side.
Figure 5B:
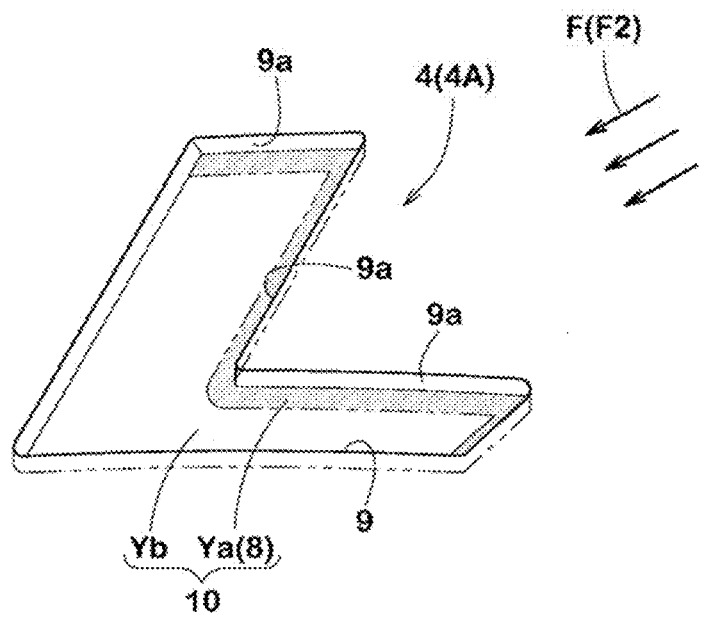

In FIG. 4A and FIG. 4B, the first direction F can be the diagonal line direction F1 from the upper left side among the diagonal line directions F1 from the diagonally upper side. However, as shown in FIG. 5A and FIG. 5B, the first direction F may be a diagonal line direction F2 from the upper right side.

Figure 6:
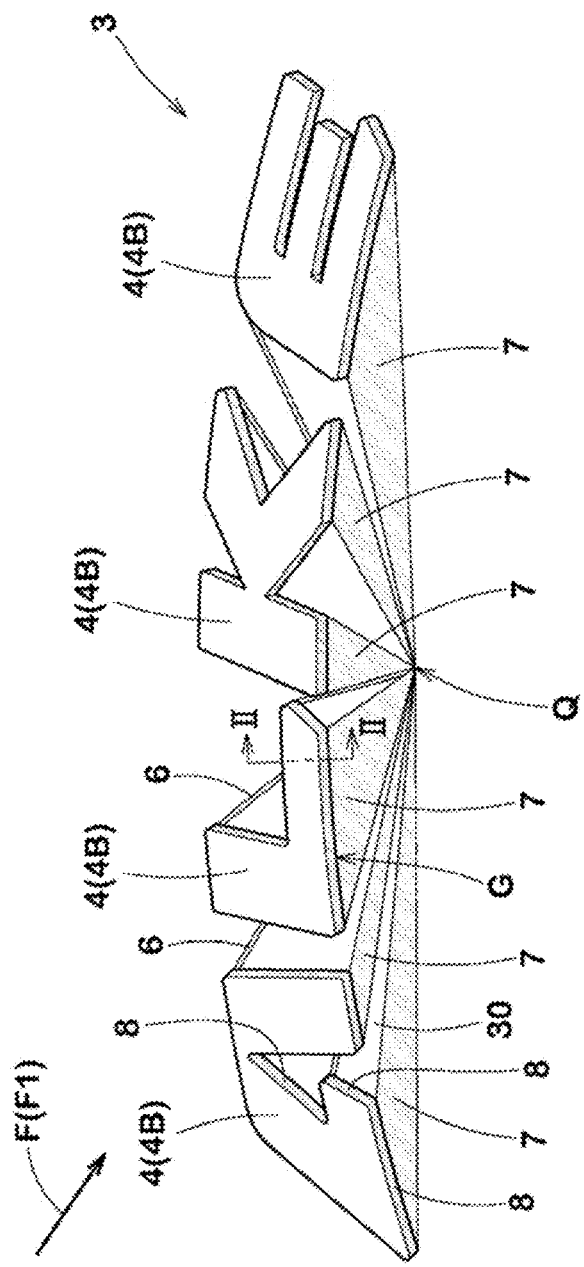
FIG. 6 is a partially enlarged side view conceptually illustrating a projecting mark and a surface geometry arrangement region, according to one or more embodiments of the present disclosure, as viewed from the front of the sidewall portion.
Figure 7:
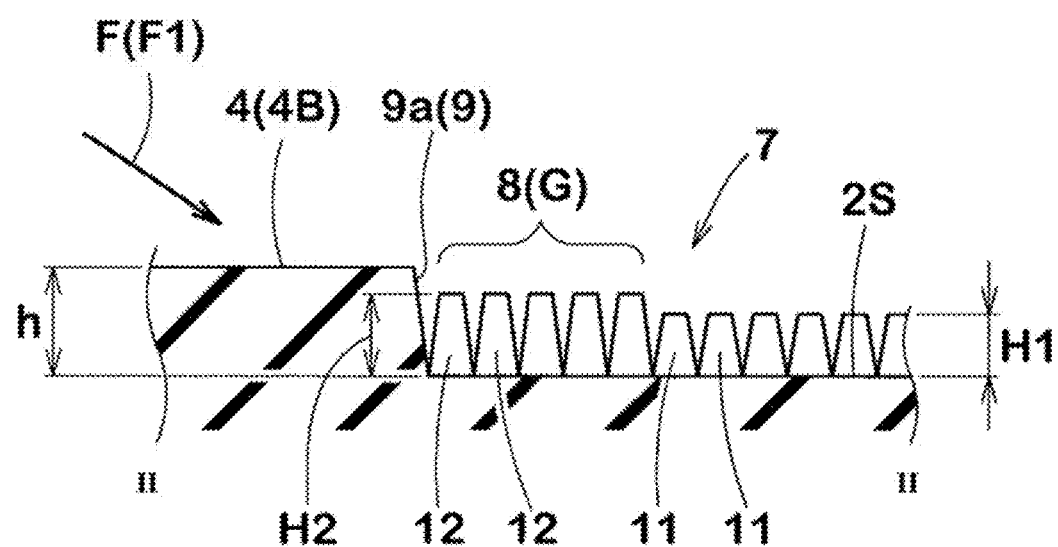
FIG. 7 is a cross-sectional view of the projecting mark and the surface geometry arrangement region as taken along a line II-II in FIG. 6.

FIG. 6 and FIG. 7 show a case where the mark 4 is a projecting mark 4B projecting from the surface 2S of the sidewall portion 2. The projecting mark 4B can include the side wall surface 9 that can be raised from the surface 2S and can surround the projecting mark 4B.

In this case, the second region 8 can be formed on the surface 2S of the sidewall portion 2. In this case, an overlapping portion G in which the second region 8 partially overlaps the first region 7 may be formed depending on the first direction F. The second region 8 can be formed in the overlapping portion G, such as shown in FIG. 7. The components common to those in the above-described embodiment are denoted by the same reference characters and description thereof is omitted.

In a case where the mark 4 is the recessed mark 4A, each of the projection height H1 of the first micro projection 11 and the projection height H2 of the second micro projection 12 can be less than the depth d (e.g., shown in FIG. 3) of the recessed mark 4A. In a case where the mark 4 is the projecting mark 4B, each of the projection height H1 of the first micro projection 11 and the projection height H2 of the second micro projection 12 can be less than a height h (e.g., shown in FIG. 7) of the projecting mark 4B.

<First Micro Projection 11>

Next, the first micro projection 11 will be described.

Figure 8A:
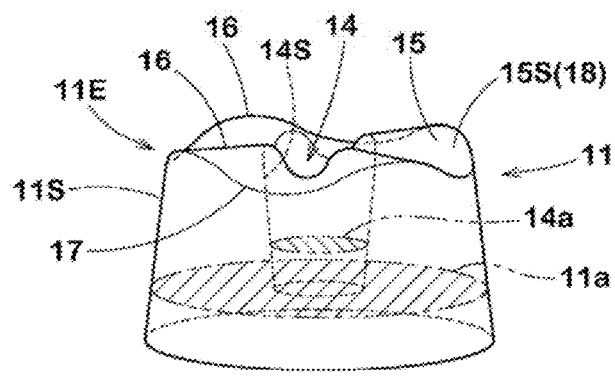
FIG. 8A and FIG. 8B are a perspective view and a side view, respectively, of a first micro projection according to one or more embodiments of the disclosed subject matter.
Figure 8B:
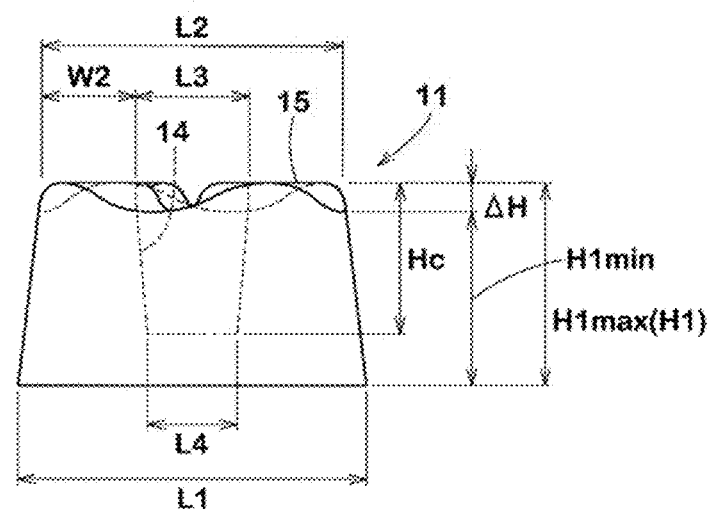

As shown in FIG. 8A and FIG. 8B, column-shaped projections can be used as the first micro projections 11. Particularly, as in this embodiment, the first micro projection 11 can include a recess 14 disposed in the upper end, and an outer wall portion 15 that can have, for example, a tubular shape, that can surround the recess 14, and can form a projection top 11E.

When light is applied to the first micro projection 11 having such a structure, light applied to an outer side face 11S (corresponding to an outer side face of the outer wall portion 15) of the first micro projection 11 can be diffused, and the surface geometry arrangement region 5 can thus look blackish. Furthermore, the light applied to the projection top 11E may be mainly reflected only by a top face 15S of the outer wall portion 15, and light can be absorbed in the recess 14. Therefore, the projection top 11E may also look blackish, and contrast with a region other than the surface geometry arrangement region 5, for example, with the mark 4 being enhanced, and visibility being enhanced.

Figure 13:
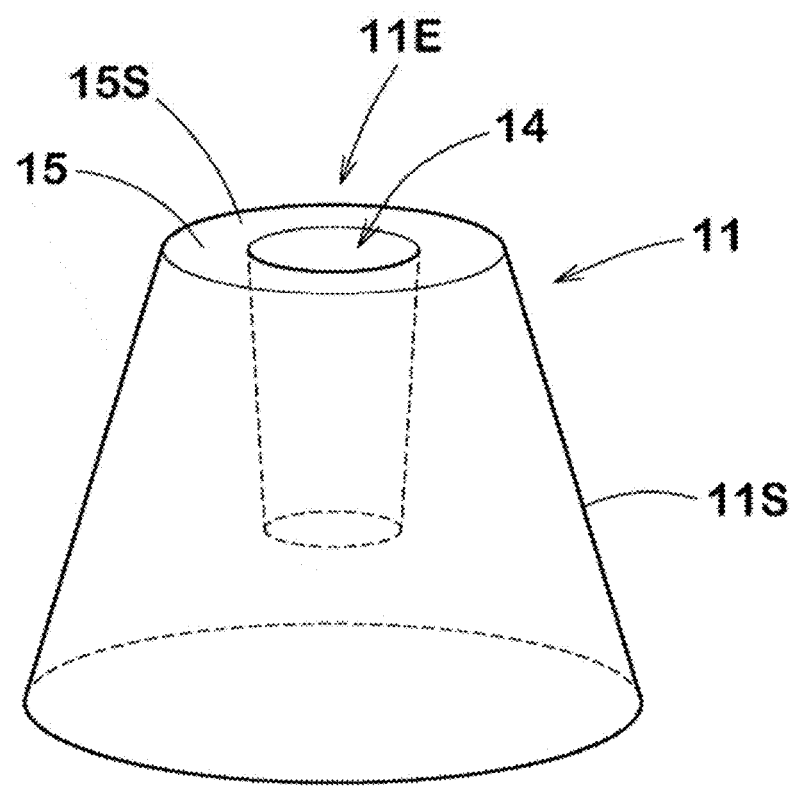
FIG. 13 is a perspective view of a first micro projection according to still another embodiment of the present disclosure.

In this embodiment, the outer wall portion 15 of the first micro projection 11 can include at least two mountain portions 16, each having a relatively large projection height in the projection height direction. In this embodiment, the outer wall portion 15 can form a tubular shape, and the mountain portions 16 and valley portions 17 each having a relatively small projection height can alternate in the circumferential direction. As shown in FIG. 13, for instance, the top face 15S may be flat.

In this embodiment, the top face 15S of the outer wall portion 15 may form a curved surface 18 in which the mountain portions 16 and the valley portions 17 can be connected in a wavy manner by smooth curved surfaces.

In the first micro projection 11 having such a structure, the top face 15S of the outer wall portion 15 can be formed as a surface that includes two or more mountain portions 16, so that light can be diffused also at the top face 15S, and the projection top 11E can be allowed to look more blackish. Thus, the first micro projections 11 of this embodiment can allow the surface geometry arrangement region 5 to look darker (more blackish) by a synergistic effect of light diffusion at the outer side face 11S, light absorption in the recess 14, and light diffusion at the top face 15S of the outer wall portion 15, as compared with, for example, truncated-cone-shaped micro projections that do not have the recess 14 in the upper end.

The number of the mountain portions 16 formed can be 3 to 6, for instance, in order to enhance a light diffusing effect.

The first micro projection 11 can have a cross-sectional shape 11a orthogonal to the projection height direction. The cross-sectional shape 11a may be circular or ellipsoidal, for instance. In the case of a circular shape, light applied from any direction can be similarly diffused. Therefore, contrast can be stably enhanced without having directivity. Meanwhile, in the case of an ellipsoidal shape, diffusion of light applied from the major axis side of the ellipsoidal shape and diffusion of light applied from the minor axis side can be made different. Therefore, the contrast can have directivity and unexpected outer appearance may be represented.

In the first micro projection 11, the cross-sectional shape 11a can be formed so as to be smaller on the upper end side (the projection top 11E side) than on the lower end side (root side of the projection). The first micro projection 11 having such a structure can have high relatively stiffness at the lower end side. Therefore, the first micro projection 11 may not be easily deformed, chipping and cracking may be inhibited, and visibility can be ensured for a relatively long time period. In this embodiment, the cross-sectional shape 11a of the first micro projection 11 can become gradually smaller from the lower end side toward the upper end side. More specifically, in the first micro projection 11 of this embodiment, the outer side face 11S can be tapered from the lower end side toward the upper end side over the entire length. However, the cross-sectional shape 11a is not limited thereto.

As shown in FIG. 8B, a maximum width L1 of the first micro projection 11 can be 0.30 to 1.00 mm, for instance. The first micro projection 11 can have the maximum width L1 at the lower end. In the first micro projection 11 having such a structure, a dark portion of a shadow formed by applied light can be assuredly enlarged. In a case where the maximum width L1 of the first micro projection 11 is less than 0.30 mm, the stiffness of the first micro projection 11 may be lowered, and cracking and chipping may be likely to occur. In a case where the maximum width L1 of the first micro projection 11 is greater than 1.00 mm, light applied to the outer side face 11S of the first micro projection 11 may be increased and the outer side face 11S may become brighter, so that contrast with the mark 4 may be lowered.

In order to effectively exhibit the above-described effects, a minimum width L2 of the first micro projection 11 can be 0.25 to 0.95 mm, for instance. The first micro projection 11 can have the minimum width L2 at the upper end. Thus, a dark portion can be formed while stiffness is ensured.

The first micro projection 11 can have a maximum height H1max at the mountain portion 16, and a minimum height H1min at the valley portion 17. The maximum height H1max can be 0.20 to 0.60 mm, for instance. In a case where the maximum height H1max is less than 0.20 mm, the first micro projection 11 may be excessively low, the light diffusing effect may be lowered, and the contrast may not become sufficient. Meanwhile, in a case where the maximum height H1max is greater than 0.60 mm, the first micro projection 11 may tend to be easily damaged.

In a case where the first micro projection 11 has the maximum height H1max, the maximum height H1max can be defined as the projection height H1 of the first micro projection 11.

Furthermore, the minimum height H1min can be 0.10 to 0.50 mm, for instance. Particularly, a difference $\Delta H =$ (H1max−H1min) between the maximum height H1max and the minimum height H1min can be 0.10 to 0.40 mm, for instance. In a case where the difference $\Delta H$ is less than 0.10 mm, it may be difficult to effectively obtain a light diffusing effect at the top face 15S of the outer wall portion 15. Conversely, in a case where the difference $\Delta H$ is greater than 0.40 mm, the mountain portion 16 may tend to be more easily damaged.

A thickness W2 of the outer wall portion 15 at the upper end can be not greater than 0.20 mm, for instance. In a case where the thickness W2 is greater than 0.20 mm, the recess 14 becomes smaller and an effect of allowing the first micro projection 11 to look blackish may tend to be lowered. The lower limit of the thickness W2 can be not less than 0.05 mm, for instance. If the lower limit is less than 0.05 mm, stiffness of the first micro projection 11 can be lowered and the first micro projection 11 may tend to be more easily damaged.

As shown in FIG. 8A, for instance, the recess 14 can have a cross-sectional shape 14a orthogonal to the depth direction. The cross-sectional shape 14a can be circular or ellipsoidal, for instance. The recess 14 having such a structure can contribute to maintaining relatively high stiffness of the first micro projection 11, absorbing light from multiple directions, and allowing the first micro projection 11 to look blackish. In this embodiment, the cross-sectional shape 14a of the recess 14 is circular. In the case of an ellipsoidal shape, contrast can have directivity and unexpected outer appearance may be represented.

The cross-sectional shape 14a of the recess 14 can be formed so as to be larger on the upper end side than on the lower end side. The first micro projection 11 having such a structure can exhibit relatively high stiffness on the lower end side, so that the first micro projection 11 may not be easily deformed, and chipping and cracking can be inhibited. In this embodiment, the cross-sectional shape 14a can be gradually enlarged from the lower end side toward the upper end side. More specifically, in the first micro projection 11 of this embodiment, an inner side face 14S of the recess 14 can be reversely tapered from the lower end side toward the upper end side over the entire length. However, the cross-sectional shape 14a is not limited thereto.

As shown in FIG. 8B, for instance, a depth Hc of the recess 14 from the mountain portion 16 can be 15% to 100% of the maximum height H1max of the first micro projection 11. In a case where the depth Hc is less than 15% thereof, light may tend to be reflected at the bottom surface of the recess 14, and an effect of allowing the first micro projection 11 to look blackish may be lowered. In a case where the depth Hc is greater than 100% thereof, stiffness of the first micro projection 11 may be lowered, and the first micro projection 11 may tend to be more easily damaged. Therefore, the depth Hc can be not greater than 90% of the maximum height H1max. The depth Hc may also be in a range of 0.15 to 0.60 mm, for instance.

A maximum width L3 of the recess 14 can be 0.10 to 0.90 mm, for instance. The recess 14 can have the maximum width L3 at the upper end. In a case where the maximum width L3 is less than 0.10 mm, an effect of absorbing light by the recess 14 may tend to be lowered. In a case where the maximum width L3 is greater than 0.90 mm, stiffness of the first micro projection 11 may be lowered and the first micro projection 11 may tend to be more easily damaged.

A minimum width L4 of the recess 14 is not particularly limited. However, according to one or more embodiments of the present disclosure, the minimum width L4 may not be greater than the maximum width L3, for instance, not greater than 70% of the maximum width L3. The recess 14 can have the minimum width L4 at the lower end.

Figure 9:
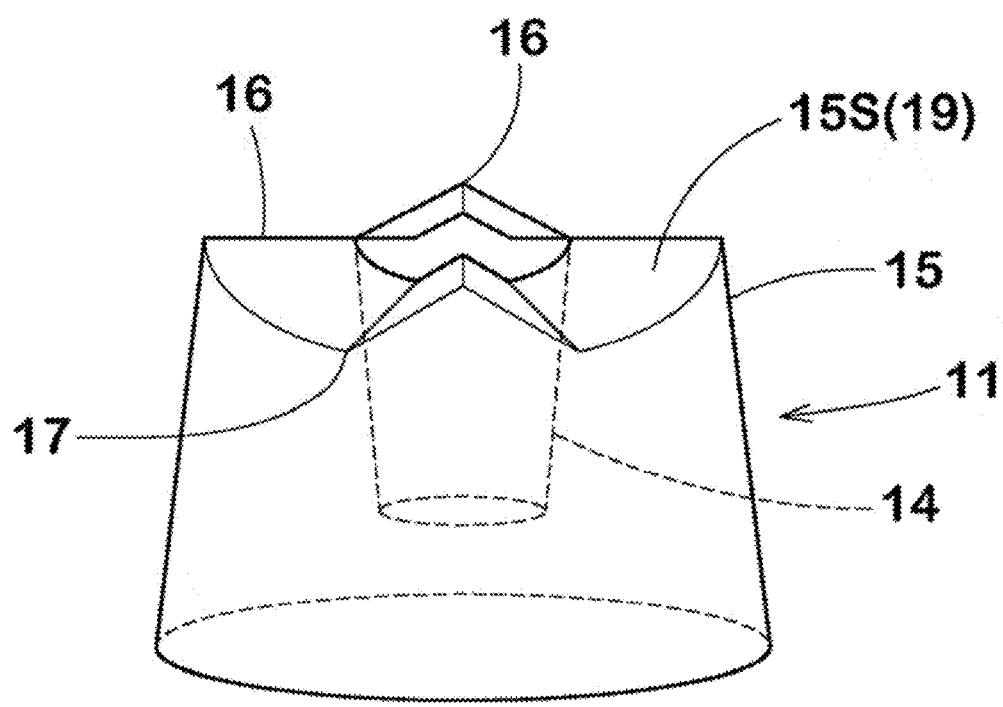
FIG. 9 is a perspective view of a first micro projection according to another embodiment of the disclosed subject matter.

FIG. 9 is a perspective view of a first micro projection 11 according to another embodiment of the present disclosure. The same components between the first micro projection 11 of the present embodiment and the first micro projections 11 of the above-described embodiments are denoted by the same reference characters, and detailed description thereof is omitted. As shown in FIG. 9, in the first micro projection 11, the top face 15S of the outer wall portion 15 surrounding the recess 14 can be in the form of a bent surface 19 in which the mountain portions 16 and the valley portions 17 can be connected by flat inclined surfaces. Also in this case, the top face 15S can allow the same effect as that of the curved surface 18 (shown in FIG. 8A and FIG. 8B) to be exhibited.

FIGS. 10A to 10C are each a side view of a first micro projection 11 according to still another embodiment of the present disclosure, and illustrate a cross-sectional shape 11a of the first micro projection 11 at positions on a line c-c in each side view. The same components between the first micro projection 11 of the present embodiment and the first micro projections 11 of the above-described embodiments are denoted by the same reference characters, and detailed description thereof is omitted.

In the first micro projection 11 shown in FIG. 10A, for example, the cross-sectional shape 11a can be formed so as to have the same size from the lower end side to the upper end side. That is, the first micro projection 11 can have a round-columnar shape. Although the first micro projection 11 having such a structure may not be ideal in terms of stiffness, an effect of allowing the first micro projection 11 to look blackish can be exhibited and contrast with the mark 4 can be emphasized, as in the tapered first micro projection 11 (shown in FIG. 8A and FIG. 8B). Furthermore, in this embodiment, a cross-sectional shape 14a of the recess 14 can be formed so as to have the same size from the lower end side to the upper end side. Although the recess 14 having such a structure may not be ideal in terms of stiffness, the recess 14 can exhibit a light absorbing effect and emphasize contrast with the mark 4, similar to the reversely tapered recess 14 (shown in FIG. 8A and FIG. 8B).

In the first micro projection 11 shown in FIG. 10B, the cross-sectional shape 11a can include a portion P1, that is, a stepped portion P1 at which the cross-sectional shape 11a becomes smaller stepwise from the lower end side toward the upper end side. In the present embodiment, one step is formed. However, a plurality of steps may be formed. In the first micro projection 11 having such a structure, an effect of allowing the first micro projection 11 to look blackish can be exhibited and contrast with the mark 4 can be emphasized while relatively high stiffness can be ensured, similar to the tapered first micro projection 11 (shown in FIG. 8A and FIG. 8B). In the first micro projection 11 of the present embodiment, a portion Y1 above the stepped portion P1 and a portion Y2 below the stepped portion P1 can each be formed in a round-columnar shape. However, the portions Y1 and Y2 may also be tapered as shown in FIG. 8A and FIG. 8B.

In the first micro projection 11 shown in FIG. 10C, at a portion (stepped portion) P1 at which the cross-sectional shape 11a becomes smaller stepwise, portions of one cross-sectional shape 11a and the other cross-sectional shape 11a can be in contact with each other. The first micro projection 11 having such a structure can allow contrast to have directivity and can generate unexpected outer appearance.

FIG. 11A and FIG. 11B are each a side view of a first micro projection 11 according to still another embodiment of the present disclosure, and illustrate a cross-sectional shape 14a of a recess 14 at positions on a line d-d in each side view. The same components between the first micro projection 11 of the present embodiment and the first micro projections 11 of the above-described embodiments are denoted by the same reference characters, and detailed description thereof is omitted.

In FIG. 11A, the recess 14 can include a portion P2, that is, a stepped portion P2 at which the cross-sectional shape 14a becomes larger stepwise from the lower end side toward the upper end side. In this embodiment, one step is formed. However, a plurality of steps may be formed. The recess 14 having such a structure can exhibit a light absorbing effect and can emphasize contrast with the mark 4 while relatively high stiffness can be ensured, similar to the reversely tapered recess 14 (shown in FIG. 8A and FIG. 8B).

In the first micro projection 11 shown in FIG. 11B, at a portion (stepped portion) P2 at which the cross-sectional shape 14a becomes smaller stepwise, portions J of one cross-sectional shape 14a and the other cross-sectional shape 14a can be in contact with each other.

Figure 12A:
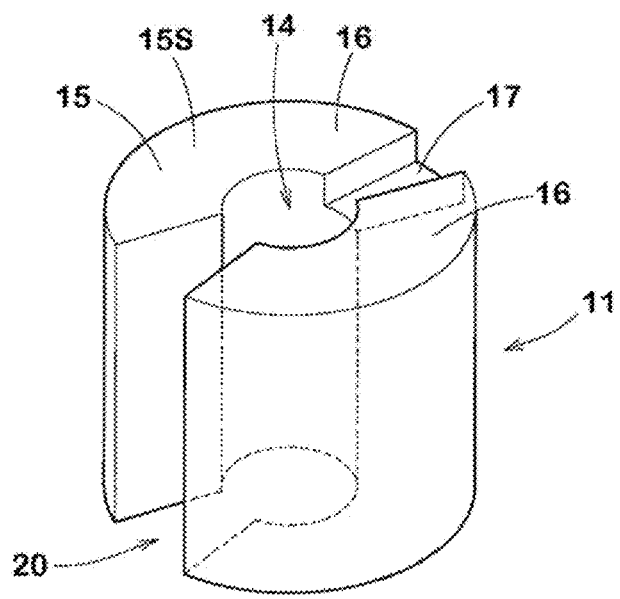
FIG. 12A and FIG. 12B are a perspective view and a plan view, respectively, of a first micro projection according to still another embodiment of the present disclosure.
Figure 12B:
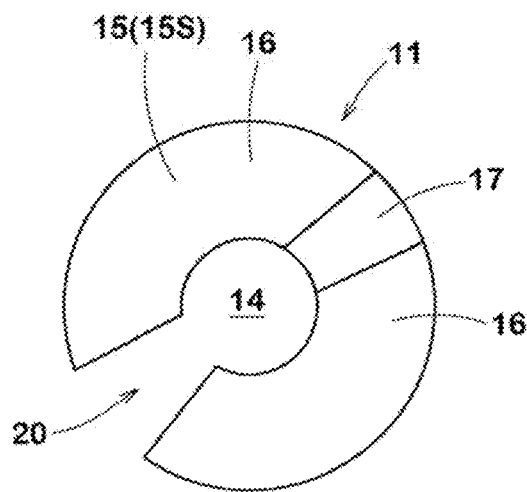

FIG. 12A and FIG. 12B are a perspective view and a plan view, respectively, of a first micro projection 11 according to still another embodiment of the present disclosure. The same components between the first micro projection 11 of the present embodiment and the first micro projections 11 of the above-described embodiments are denoted by the same reference characters, and detailed description thereof is omitted.

In FIG. 12A and FIG. 12B, in the first micro projection 11, an outer wall portion 15 can have two mountain portions 16 and one valley portion 17. Specifically, the outer wall portion 15 that surrounds a recess 14 may not be tubular but can be formed in a C-shape by a slit 20 so as to be disconnected in the circumferential direction. At a top face 15S of the outer wall portion 15, the two mountain portions 16 and the one valley portion 17 can be formed so as to be stepped. In this embodiment, the mountain portion 16 can have a flat surface.

A rib-like projection (for example, ridge) having a thickness reduced toward the upper end may be adopted as the first micro projection 11. In this case, the rib-like projections (first micro projections 11) can be disposed so as to extend radially from the vanishing point Q.

The second micro projection 12 is not particularly limited, but can have a shape analogous to that of the first micro projection 11.

Although the particularly preferable embodiments of the present disclosure have been described above in detail, the present disclosure is not limited to the illustrated embodiments, and various modifications can be made to implement the present disclosure.

Examples

As shown in FIG. 1, pneumatic tires (e.g., pneumatic tire 1) each having indicia (character string of "ALKE") including marks, on a surface of a sidewall portion, were produced. The tires had surface geometry arrangement regions, according to the specifications indicated in Table 1, each having a first region in which a plurality of first micro projections was disposed, and/or a second region in which a plurality of second micro projections was disposed. In Table 1, comparative example 1 was a tire having no surface geometry arrangement region.

Visibility of the indicia was tested for each tire. The common specifications and the test method were as follows.
<Common Specifications>
First micro projection: column-shaped projection (e.g., FIG. 8A and FIG. 9)
  Recess: Present
  The number of mountain portions formed: 4
  Shape of upper end surface: curved surface
  Maximum height H1max <mm>: 0.3
  Minimum height H1min <mm>: 0.2
  Difference ΔH <mm>: 0.1
  Minimum width L2 <mm>: 0.41
  Maximum width L1 <mm>: 0.54
  Depth Hc<mm> of recess: 0.3
  Maximum width L3<mm> of recess: 0.31
  Minimum width L4<mm> of recess: 0.2
  Thickness W2 <mm>: 0.05
The second micro projection had a shape analogous to that of the first micro projection.
<Visibility>
Sensory evaluation for visibility was visually performed. The visibility is indicated as an index for evaluation with an index of comparative example 1 being 100. The greater the value is, the more excellent the visibility is.

can be disposed in a region in which a shadow is formed by the side wall surface when light is applied to the mark in a first direction.

In the tire of the present disclosure, a projection height of each first micro projection can be less than a projection height of each second micro projection.

In the tire of the present disclosure, an arrangement density of the first micro projections can be less than an arrangement density of the second micro projections.

In the tire of the present disclosure, the first micro projections can each include a recess and an outer wall portion surrounding the recess and forming a top face.

In the tire of the present disclosure, the top face of the outer wall portion can include at least two mountain portions in which a projection height is large in a projection height direction.

In the tire of the present disclosure, in the top face, the mountain portions and valley portions in which a projection height is relatively small can alternate in a circumferential direction.

In the tire of the present disclosure, the top face can be a curved surface in which mountain portions and valley portions can be connected by smooth curved surfaces.

TABLE 1

|  | Comp. Ex. 1 | Comp. Ex. 2 | Ex. 1 | Ex. 2 | Ex. 3 | Ex. 4 | Ex. 5 |
| --- | --- | --- | --- | --- | --- | --- | --- |
| <Mark> |  |  | Recessed mark |  |  | Projecting mark | |
| Depth d or height h <mm> |  |  | d = 0.5 |  |  | h = 0.5 | |
| <Surface geometry arrangement region> |  |  |  |  |  |  |  |
| Presence or absence of first region | Absent | Absent |  |  | Present |  |  |
| Presence or absence of second region | Absent |  | Present | Present | Present | Absent | Present |
| Relationship between projection height H1 of first micro projection and projection height H2 of second micro projection | — | — | H1 < H2 | H1 = H2 | H1 = H2 | — | H1 < H2 |
| Relationship between arrangement density M1 of first micro projections and arrangement density M2 of second micro projections | — | — | M1 = M2 | M1 = M2 | M1 < M2 | — | M1 = M2 |
| Visibility | 100 | 105 | 140 | 135 | 140 | 115 | 140 |

As indicated in Table 1, it can be confirmed that visibility of the indicia was superior in the tires of the examples.

In the tire of the present disclosure, a plurality of the marks can be formed on the sidewall portion, and the surface geometry arrangement region can include the first region extending from the vanishing point to each of the marks.

In the tire of the present disclosure, the mark can include a side wall surface, the surface geometry arrangement region can include a second region having a plurality of second micro projections disposed therein, and the second region In the present disclosure, as described above, the surface geometry arrangement region can include the first region disposed adjacent to the mark outside the mark. The first region can have a plurality of the first micro projections disposed therein, and can radially extend from the vanishing point on the surface of the sidewall portion toward the mark so as to allow the mark to be stereoscopically viewed.

In the first region having such a structure, the plurality of the first micro projections can inhibit light from being reflected and can enhance light absorptivity. Therefore, the first region can look darker as compared with the mark disposed adjacent thereto. Furthermore, the first region can radially extend from the vanishing point toward the mark.

Thus, the mark can be stereoscopically viewed, particularly, to appear as if it projects from the depth side. As a result, the appearance can be enhanced, and the mark can be represented with a stereoscopic effect, to enhance visibility of the mark.

What is claimed is:

1. A tire comprising:
a sidewall portion,
wherein at least one mark in the form of a character or a figure is disposed on a surface of the sidewall portion,
wherein a surface geometry arrangement region comprising a first region is formed adjacent to the mark on the surface of the sidewall portion outside the mark,
wherein the first region has a plurality of first micro projections disposed therein,
wherein the first region extends radially from a vanishing point on the surface of the sidewall portion toward the mark so as to allow the mark to be stereoscopically viewed,
wherein the mark comprises a side wall surface,
wherein the surface geometry arrangement region comprises a second region having a plurality of second micro projections disposed therein,
wherein the second region is disposed in a region in which a shadow is formed by the sidewall surface when light is applied to the mark in a first direction, and
wherein a first projection height of each first micro projection is less than a second projection height of each second micro projection.

2. The tire according to claim 1,
wherein a plurality of the marks is formed on the sidewall portion, and
wherein the surface geometry arrangement region comprises the first region extending from the vanishing point to each of the marks.

3. The tire according to claim 1, wherein an arrangement density of the first micro projections is less than an arrangement density of the second micro projections.

4. The tire according to claim 1, wherein the first micro projections each comprise a recess and an outer wall portion surrounding the recess and forming a top face.

5. The tire according to claim 4, wherein the top face of the outer wall portion comprises at least two mountain portions in which a projection height in a projection height direction is greatest for the top face of the outer wall portion.

6. The tire according to claim 5, wherein, in the top face of the outer wall portion, the mountain portions and valley portions in which the projection height is less than the projection height of the mountain portions alternate in a circumferential direction.

7. The tire according to claim 4, wherein the top face is a curved surface in which mountain portions and valley portions are connected by smooth curved surfaces.

8. The tire according to claim 1,
wherein the vanishing point is disposed at a center portion including a width center of a width of the mark, and
wherein the center portion is defined as a region in which a distance from the width center of the mark to each end of the mark in a tire circumferential direction is not greater than 5% of the width of the mark.

9. The tire according to claim 1, wherein a width of the second region in a direction orthogonal to the side wall surface of the mark is not greater than 4.0 times a depth of the mark.

10. The tire according to claim 1, wherein the first direction is a diagonal line direction from a tire radially outer side toward a tire radially inner side as viewed a front of the mark.

11. The tire according to claim 1,
wherein each of the first micro projections and the second micro projections taper from thick to thin in a height direction.

12. The tire according to claim 1,
wherein the second micro projections are recessed with respect to an upper surface of the surface of the sidewall portion.

13. A tire comprising:
a sidewall portion,
wherein at least one mark in the form of a character or a figure is disposed on a surface of the sidewall portion,
wherein a surface geometry arrangement region is formed at least partially adjacent to the mark on the surface of the sidewall portion outside the mark,
wherein the surface geometry arrangement region includes a first region that has a plurality of first micro projections,
wherein the first region extends radially from a vanishing point on the surface of the sidewall portion toward the mark,
wherein the mark comprises a side wall surface,
wherein the surface geometry arrangement region includes a second region that has a plurality of second micro projections,
wherein the second region is disposed in a region in which a shadow is formed by the sidewall surface when light is applied to the mark in a first direction,
wherein the first micro projections and the second micro projections are recessed with respect to an upper surface of the surface of the sidewall portion,
wherein a first projection height of the first micro projections is uniform,
wherein a second projection height of the second micro projections is uniform, and
wherein the second projection height is greater than the first projection height.

14. The tire according to claim 13,
wherein the second micro projections are closer to the mark than the first micro projections are to the mark.

15. A tire comprising:
a sidewall portion,
wherein at least one mark in the form of a character or a figure is disposed on a surface of the sidewall portion,
wherein a surface geometry arrangement region comprising a first region is formed adjacent to the mark on the surface of the sidewall portion outside the mark,
wherein the first region has a plurality of first micro projections disposed therein,
wherein the first region extends radially from a vanishing point on the surface of the sidewall portion toward the mark so as to allow the mark to be stereoscopically viewed, wherein the mark comprises a side wall surface, wherein the surface geometry arrangement region comprises a second region having a plurality of second micro projections disposed therein, wherein the second region is disposed in a region in which a shadow is formed by the sidewall surface when light is applied to the mark in a first direction, and wherein a width of the second region in a direction orthogonal to the side wall surface of the mark is not greater than 4.0 times a depth of the mark.

16. A tire comprising:

a sidewall portion, wherein at least one mark in the form of a character or a figure is disposed on a surface of the sidewall portion, wherein a surface geometry arrangement region is formed at least partially adjacent to the mark on the surface of the sidewall portion outside the mark, wherein the surface geometry arrangement region includes a first region that has a plurality of first micro projections, wherein the first region extends radially from a vanishing point on the surface of the sidewall portion toward the mark, wherein the mark comprises a side wall surface, wherein the surface geometry arrangement region includes a second region that has a plurality of second micro projections, wherein the second region is disposed in a region in which a shadow is formed by the sidewall surface when light is applied to the mark in a first direction, wherein a first projection height of the first micro projections is uniform, wherein a second projection height of the second micro projections is uniform, wherein the second projection height is greater than the first projection height, and wherein the second micro projections are closer to the mark than the first micro projections are to the mark.

* * * * *